(No Model.)
G. M. LEASE.
CUTTER BAR FOR REAPERS AND MOWERS.
No. 349,311. Patented Sept. 21, 1886.
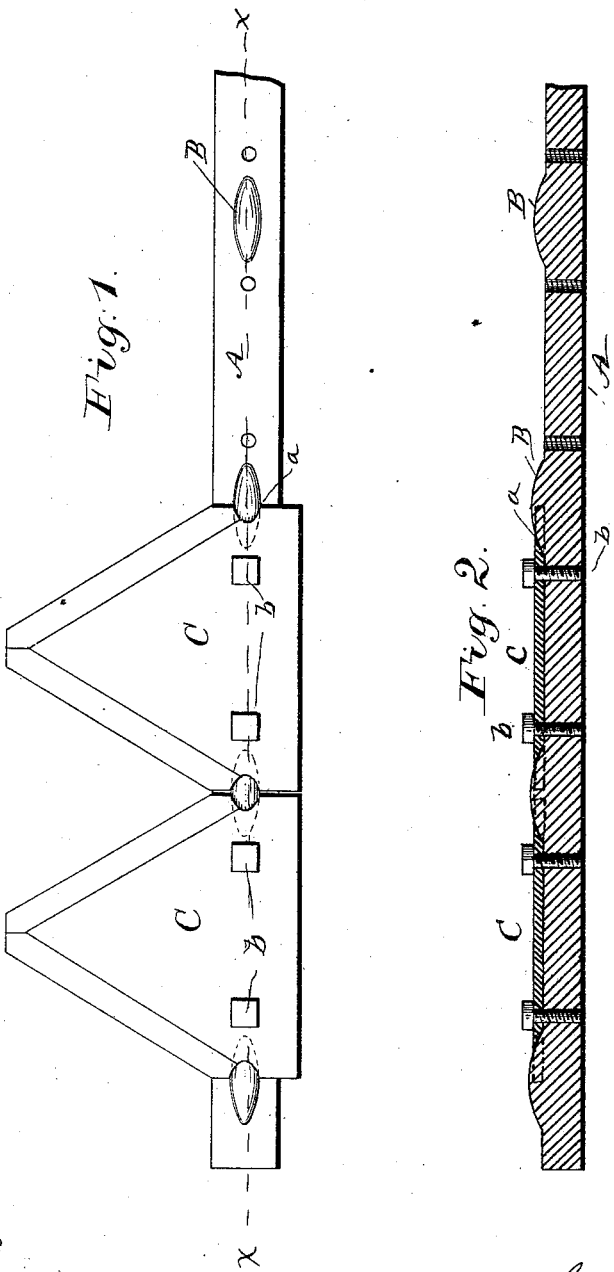

UNITED STATES PATENT OFFICE.

GEORGE M. LEASE, OF CENTRALIA, MISSOURI.

CUTTER-BAR FOR REAPERS AND MOWERS.

SPECIFICATION forming part of Letters Patent No. 349,311, dated September 21, 1886.

Application filed August 20, 1885. Serial No. 174,887. (No model.)

*To all whom it may concern:*

Be it known that I, GEORGE M. LEASE, a citizen of the United States, residing at Centralia, in the county of Boone and State of Missouri, have invented certain new and useful Improvements in Cutter-Bars for Reapers and Mowers, of which the following is a specification, reference being had therein to the accompanying drawings.

My invention relates to improvements in devices for attaching cutters to the cutter-bars of reaping and mowing machines.

The object of my invention is to provide a simple and efficient attachment of cutters to the cutter-bars of reaping and mowing machines, so that any cutter when dulled or broken can be readily removed and another put in its place without having to remove the cutter-bar from the machine.

My invention consists in providing the cutter-bar with a series of elevations or raised portions, which are adapted to fit into corresponding recesses or cavities formed in the edges of the cutters, and in securing said cutters to the cutter-bar by means of screw-bolts, whereby a supplemental or clamping bar is dispensed with and any one of the cutters can be removed from the cutter-bar and another put in its place without removing said bar from the machine.

Referring to the drawings, Figure 1 is a top or plan view of my improved cutter-bar. Fig. 2 is a longitudinal sectional view of the same, taken on the line *x x*.

A is the cutter-bar, of any suitable construction, the upper side of which is provided with raised portions or projections B, said raised portions being adapted to fit in correspondingly-shaped cavities *a*, formed in the edges of the cutters C. The projections or raised portions B are, by preference, made in the shape of an elongated oval, as shown, which will admit of the ready removal of each cutter independent of the other cutters when the same is released from the action of the screw-bolts which hold the cutters on the cutter-bar.

C are the cutters, which are of the usual form, said cutters being held in position on the cutter-bar A by means of screw-bolts *b*, as before indicated. The adjacent edges of the cutters C are notched, and the edges of said notches are undercut to partially overlie the projections B, and to conform to their shape, being thus adapted to receive such raised portions, so as to prevent the cutter from moving laterally so long as it is held in contact with the cutter-bar by one or more of the screw-bolts *b*.

Having thus described my invention, what I claim, and desire to secure by Letters Patent, is—

A cutter-bar for reaping and mowing machines, provided with elongated oval projections, as described, in combination with the cutters having their adjacent edges notched and the edges of the notches undercut to partially overlie the projections, and the screws or bolts for securing the cutters to the cutter-bar, substantially as set forth.

In testimony whereof I affix my signature in presence of two witnesses.

GEORGE M. LEASF.

Witnesses:
J. T. MITCHELL,
C. H. EARLY.